United States Patent [19]

White et al.

[11] Patent Number: 4,484,124

[45] Date of Patent: Nov. 20, 1984

[54] METHOD OF AND APPARATUS FOR DAMPING OF STEPPER MOTOR USING NON-ACTIVE WINDINGS

[75] Inventors: James N. J. White, Kinross; David S. Ruxton, Crieff; Alec D. Stewart, Fife, all of Scotland

[73] Assignee: Rodime Limited, Scotland

[21] Appl. No.: 391,150

[22] Filed: Jun. 23, 1982

[30] Foreign Application Priority Data

Jun. 30, 1981 [GB] United Kingdom ................ 8120093

[51] Int. Cl.³ ........................................ H02K 29/04

[52] U.S. Cl. .................................. 318/696; 318/685

[58] Field of Search ............................ 318/696, 685

[56] References Cited

U.S. PATENT DOCUMENTS

| | | | |
|---|---|---|---|
| 3,328,658 | 6/1967 | Thompson | 318/696 |
| 4,129,816 | 12/1978 | Feldy | 318/696 |

FOREIGN PATENT DOCUMENTS

| | | |
|---|---|---|
| 0012885 | 9/1980 | European Pat. Off. . |
| 2742932 | 3/1979 | Fed. Rep. of Germany . |
| 1555056 | 12/1968 | France . |
| 2089124 | 1/1972 | France . |
| 2211798 | 7/1974 | France . |

OTHER PUBLICATIONS

Patents Abstracts of Japan, vol. 5, No. 3, Jan. 10, 1981, pp. 675 E 40 & JP-A-55 133 700.

*Primary Examiner*—B. Dobeck

*Assistant Examiner*—Saul M. Bergmann

*Attorney, Agent, or Firm*—Gerald J. Ferguson, Jr.; Joseph J. Baker

[57] ABSTRACT

In a disk drive system which uses as stepper motor, overshooting of the desired final position is reduced by short-circuiting the windings of the stepper motor which normally remain open-circuit or are switched off. This short-circuiting provides a current path for any EMF induced in the unused windings. This effect is achieved by connecting a pair of transistors in parallel with each other and with each respective winding. The transistors are connected in opposite polarity to provide a short-circuit regardless of the polarity of the EMF across the windings. The transistors are connected to a microprocessor which is programmed such that the windings are selectively short circuited and the short circuits are applied at a predetermined time with regard to the step so that 'damping' is optimized. The microprocessor may be programmed to switch the transistors on and off as desired giving flexible timing to suit different conditions. One or more stepper motor steps may be treated in this manner.

4 Claims, 4 Drawing Figures

| TRACK | POLE 1 A | POLE 1 B | POLE 2 C | POLE 2 D |
|---|---|---|---|---|
| 0 | 1 | 0 | 0 | 1 |
| 1 | 1 | 0 | 0 | 0 |
| 2 | 1 | 0 | 1 | 0 |
| 3 | 0 | 0 | 1 | 0 |
| 4 | 0 | 1 | 1 | 0 |
| 5 | 0 | 1 | 0 | 0 |
| 6 | 0 | 1 | 0 | 1 |
| 7 | 0 | 0 | 0 | 1 |
| 8 | 1 | 0 | 0 | 1 |
| 9 | 1 | 0 | 0 | 0 |

Fig.2.

| TRACK | POLE 1 A | POLE 1 B | POLE 2 C | POLE 2 D |
|---|---|---|---|---|
| 0 | 1 | 0 | 0 | 1 |
| 1 | 1 | 0 | 1 | 0 |
| 2 | 0 | 1 | 1 | 0 |
| 3 | 0 | 1 | 0 | 1 |
| 4 | 1 | 0 | 0 | 1 |
| 5 | | | | |

METHOD OF AND APPARATUS FOR DAMPING OF STEPPER MOTOR USING NON-ACTIVE WINDINGS

The present invention relates to a method of, and apparatus for, damping the movement of a stepper motor.

In conventional 2-phase stepper motor there are two poles each pole having two windings. In normal application current is applied in a predetermined sequence to the windings (FIGS. 1, 2) and the motor moves accordingly, controlled motion of the stepper motor being achieved by digitally switching the current between motor windings. During this switching at least one winding always remains 'on' and the remaining windings are switched off i.e. open circuit. With this method of driving the stepper motor there is relatively little damping of the motor when it completes its last step. This can result in overshooting of the desired final position with corresponding increase in settling time. This is considered a disadvantage of conventional stepper motors.

An object of the present invention is to obviate or to mitigate the above said disadvantages.

It was found that the damping characteristics of the motor could be considerably improved if the remaining two open circuit windings were short-circuited. This short-circuiting provides a current path for any EMF induced in the unused windings.

According to a first aspect of the present invention there is provided a method of controlling the damping of stepper motor movement comprising,

- sensing at least at the penultimate step which windings are receiving current.
- switching current to the appropriate winding or windings in accordance with the step sequence, and
- short circuiting the windings not being supplied with current or switched off.

According to a second aspect of the present invention there is provided apparatus for controlling the damping of movement of a stepper motor comprising, short-circuiting means connected in parallel with each winding of the stepper motor, said short-circuiting means being connected to control means, whereby in use, the windings not receiving current are short-circuited in response to signals from said control means and a path is provided for the back electro-motive force (EMF) induced in the windings not receiving current, said back EMF producing a damping effect.

Preferably said short-circuiting means is a pair of transistors connected in parallel with each other and with a respective winding, the transistors being connected in opposite polarity whereby a short-circuit is provided across the respective winding regardless of the polarity of EMF across the winding.

Preferably also, said transistors are of the PNP type.

Alternatively, said short-circuiting means is a pair of any other type of switchable elements connected in parallel with each other and with a respective winding, the elements being connected in opposite polarity.

Preferably also, each switching means is connected to a microprocessor which controls the switching on and off of said switching means in accordance with the position of the last step.

An embodiment of the present invention will now be described by way of example with reference to the accompanying drawings in which:

FIG. 1 is a table showing a half-step sequence for a 2-pole stepper in which current is applied to the stepper motor windings.

FIG. 2 is similar to FIG. 1 and shows a full-step sequence for a 2-pole stepper motor.

Figure 3:
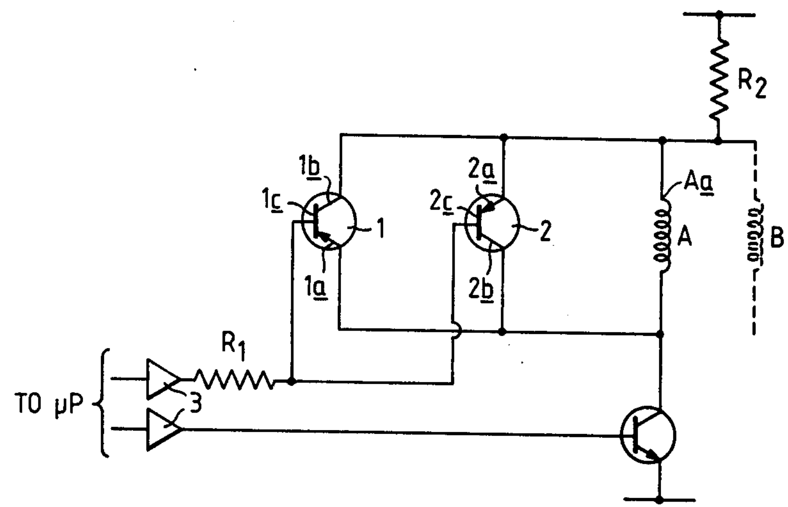
FIG. 3 is a circuit diagram showing the circuit arrangement for short-circuiting one winding.

Referring now to the drawings a winding A has two PNP transistors 1, 2 (FIGS. 3, 4) connected in parallel. The transistors 1, 2 are connected across the winding A in an opposite sense; the emitter 1*a* is connected to the collector 2*b* and the collector 1*b* is connected to the emitter 2*a*. The bases 1*c*, 2*c* of the transistors are connected commonly viz a buffering resistor $R_1$, an amplifier 3 to a microprocessor (not shown). This circuit arrangement is repeated for each winding B,C,D as shown in FIG. 4.

In use current is applied to the windings in accordance with FIG. 1 if a half-step sequence is used or in accordance with FIG. 2 if a full-step sequence is used.

As a first example consider the operation of the invention with the half-step sequence shown in FIG. 1.

To go from step 2 to step 3, winding C remains 'on' and winding A is switched off. A signal programmable from the microprocessor (not shown) to the respective windings which remain switched off, B.D. (FIG. 4) causes both transistors connected to each winding to be switched on.

The time when the windings are short-circuited is programmable, and is such that the performance of the stepper motor is not limited by short-circuiting too soon after a particular winding is switched-off. The windings B and D are therefore short-circuited producing two closed circuit loops. The two loops are required because the stepper motor can move in either direction setting up a back EMF and a current flow in either direction across the winding. For example, if the end Ba of the winding is positive the current flows through transistor 3 in the direction shown (FIG. 4). Alternatively if the end Bb is positive the current flows through transistor 4 in the direction shown. Whichever loop conducts, the other loop is effectively a high impedance.

As a second example with the half-step sequence consider moving from step 3 to step 4. In this case the winding 'C' remains 'on' and winding B is switched on.

A signal from the microprocessor to windings A and D simultaneously switches the transistors connected to each winding on short-circuiting the windings. The operation is then the same as described in the first example, and is repeated for the other steps in the sequence.

Figure 4:
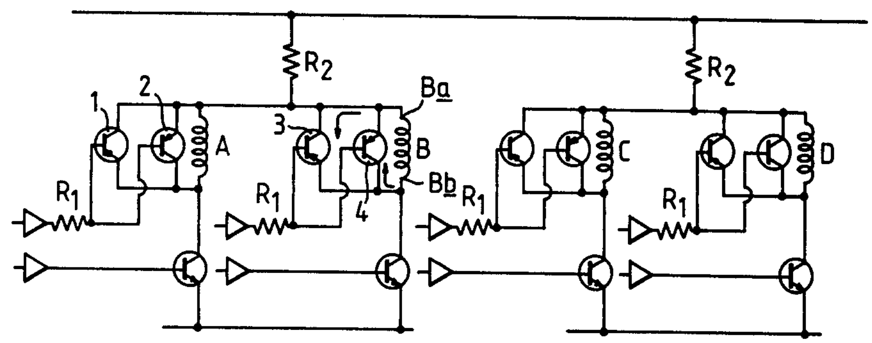
FIG. 4 is similar to FIG. 3 and shows the complete circuit configuration with a short-circuit arrangement for each winding.

Without departing from the scope of the invention various modifications may be made to the circuits shown in FIGS. 3 and 4. For example, switchable diodes or other suitable switching elements may replace the PNP transistors. Although a microprocessor is used to control the short-circuiting of the windings an equivalent logic circuit could be used to perform the same function.

In addition, in certain circumstances in the full-step or half-step operation, the winding which has just been switched-off i.e. winding C, step 4-5 in FIG. 1 or winding A, step 1-2 in FIG. 2 is short-circuited in addition to the 'dead' windings. In the full-step sequence that provides symmetry to the short-circuiting applied to the windings resulting in a more balanced response and in the half-step sequence the damping response is improved.

The circuits hereinbefore described are particularly suited for use with the microprocessor based stepper motor control circuit discussed in European Patent application No. 82302197.7 the short-circuiting of the windings being carried out at the final step during an inter-track stepper motor movement, that is when micro-stepping begins. The eight short-circuiting transistors are located on 2 'chips' and the four buffering resistors are located on a separate chip.

Advantages of the present invention are, damping produced by the retarding torque results in a faster track access time, and the accuracy of operation is improved. The circuit involves very few components and is also suited to control by the existing microprocessor present in the stepper motor control circuit.

Thus there is provided a method of, and apparatus, for damping the movement of the stepper motor using the non-active stepping motor windings.

We claim:

1. A method of controlling the damping of stepper motor movement characterised by:

sensing at least at the penultimate step which windings are receiving current, switching current to the appropriate winding or windings at a predetermined time in accordance with the step sequence, and selectively short circuiting the windings not being supplied with current or switched off to provide a bi-directional current path for a current driven by the back electro-motive force (EMF) induced in the non-active windings.

2. In apparatus for controlling the movement of a stepper motor having control means for selectively energising a plurality of windings of the stepper motor, the improvement comprising a corresponding plurality of short-circuiting means connected each across a respective stepper motor winding to provide a bi-directional current path when selectively enabled by said control means, the control means being operable to enable the short-circuiting means of those windings which are not receiving current or being switched off as the stepper motor moves from a penultimate to a destination step, whereby a current driven by the back electro-motive force (EMF) induced in those windings may circulate to provide a damping effect.

3. Apparatus as claimed in claim 2 in which each said short-circuiting means is a pair of transistors connected in parallel with each other and with a respective winding, the transistors being connected in opposite polarity whereby a short circuit is provided across the winding regardless of polarity EMF across the winding.

4. Apparatus as claimed in claim 3 in which each transistor is connected to a microprocessor which controls the switching on and off of said transistor in accordance with the position of the last step.

* * * * *